United States Patent
Manross

[15] 3,652,044
[45] Mar. 28, 1972

[54] ADJUSTABLE MOTOR MOUNT

[72] Inventor: Delbert Manross, Willoughby, Ohio

[73] Assignee: The Lincoln Electric Company, Cleveland, Ohio

[22] Filed: Dec. 27, 1969

[21] Appl. No.: 869,775

[52] U.S. Cl. .................................................. 248/23
[51] Int. Cl. .............................................. F16m 11/04
[58] Field of Search .................................... 248/23

[56] References Cited

UNITED STATES PATENTS

| | | | |
|---|---|---|---|
| 1,511,336 | 10/1924 | Hoey | 248/23 |
| 2,765,997 | 10/1956 | Motts | 248/23 |
| 2,923,146 | 2/1960 | Mayer | 248/23 X |
| 2,934,384 | 4/1960 | Sloyan | 248/23 X |

Primary Examiner—William H. Schultz
Attorney—Meyer, Tilberry and Body

[57] ABSTRACT

A mount for adjustably positioning an apparatus comprising a unitary, elongated base member having a supporting surface. The base member is a short section of an aluminum extrusion so that it has a generally uniform transverse cross-sectional shape throughout its longitudinal extent and has a pair of longitudinal slots in the supporting surface coextensive with the base member into which bolts extend for holding the apparatus in any adjusted position. A screw is provided for displacing the apparatus along the base member.

8 Claims, 7 Drawing Figures

PATENTED MAR 28 1972
3,652,044
SHEET 1 OF 2
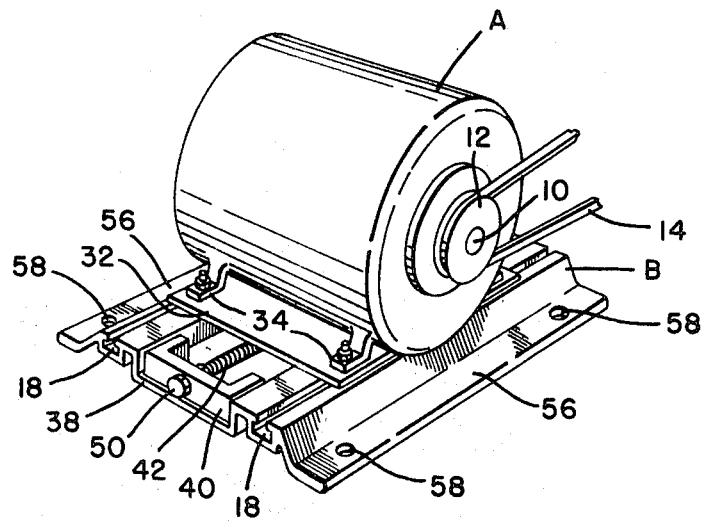
FIG. 1
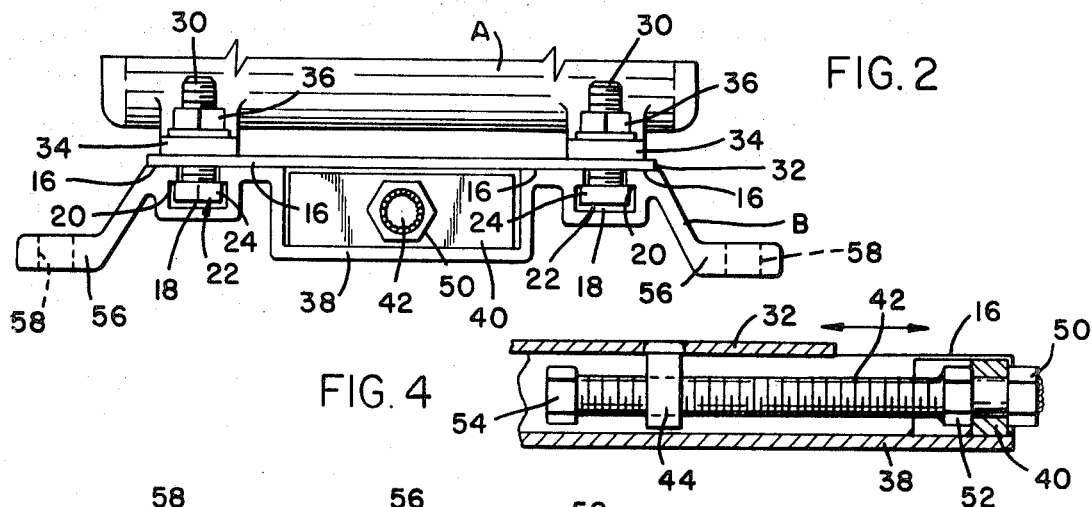
FIG. 2
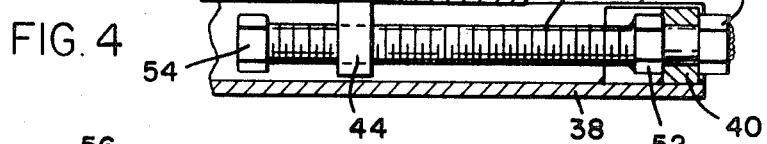
FIG. 4
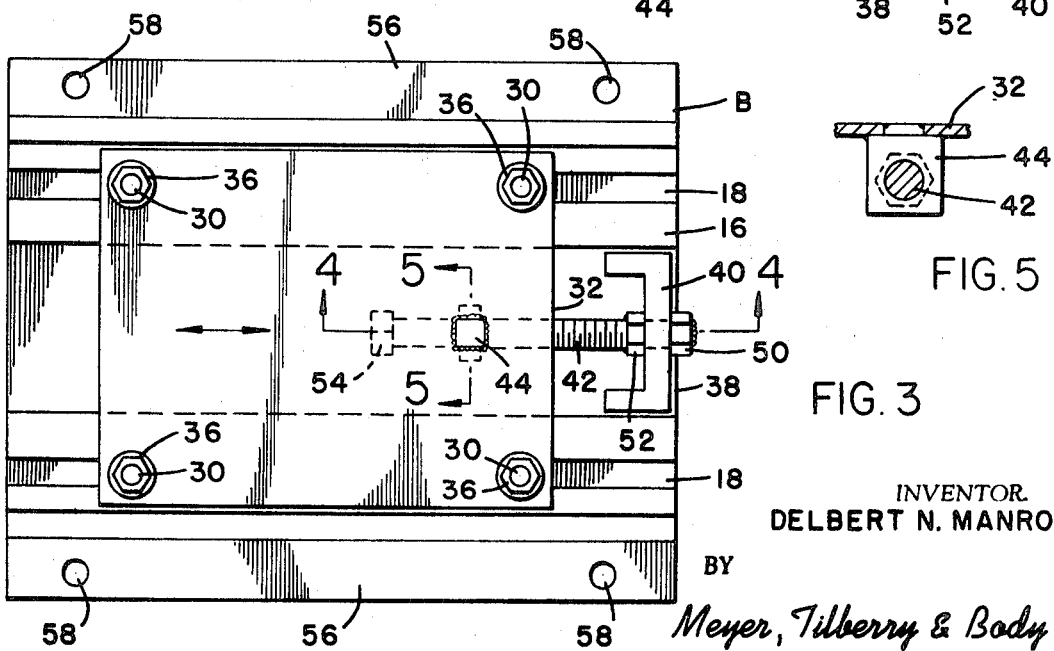
FIG. 5
FIG. 3
INVENTOR.
DELBERT N. MANROSS
BY
Meyer, Tilberry & Body
ATTORNEYS

INVENTOR.
DELBERT N. MANROSS

BY

Meyer, Tilberry & Body
ATTORNEYS

ADJUSTABLE MOTOR MOUNT

This invention pertains to the support art and more particularly to an improved mount for apparatus.

The invention is particularly applicable to mounts for adjustably positioning a motor with reference to equipment it is driving by means of a belt or chain and will be described with specific reference thereto; however, it is to be appreciated that the invention has broader applications and may be used whenever it is desired to adjustably position a first apparatus with respect to a second apparatus.

Motor mounts are well known in the art, and are used to adjust the tension on the belt which drivingly connects the output pulley of the motor to the input pulley of the apparatus which is being driven. Adjustable motor mounts have heretofore comprised a stationary base portion which is bolted to a supporting structure and a movable slide member carried by the base portion for supporting the motor. Additionally, there is provided adjusting means for displacing the slide member relative to the base portion.

Motor mounts heretofore have been made from either stamped or bent metal sheets which are then either welded or bolted together to form the desired configuration. Such forming and assembly steps are expensive, time consuming and complicated.

The present invention contemplates a new and improved apparatus which overcomes all of the above-referred problems and others and provides a mount which may be rapidly and economically manufactured.

In accordance with the present invention, the mount is comprised of a short section of a metal extrusion having a cross-sectional shape to provide as an integral unit a supporting surface, and mounting feet. The cross-sectional shape may also be such as to provide a pair of inverted T-shaped slots in the supporting surface and/or space for adjusting means.

Further in accordance with the present invention, there is provided a mount for adjustably positioning an apparatus comprising an elongated, unitary base member having a supporting surface adapted to adjustably carry the apparatus; the base member being formed of a transverse section of an extrusion so as to have a generally uniform transverse cross-sectional shape throughout its longitudinal extent and having at least one longitudinal slot in the supporting surface extending throughout at least a major portion of the base member; the slot being adapted to slidably receive means for releasably securing the apparatus on the supporting surface. Preferably the shape is such as to bridge the slot into an inversely T-shaped configuration whereby the base member is a unitary extrusion. Additionally, the supporting surface preferably includes a longitudinal depression in which adjusting means may be disposed.

In accordance with another aspect of the present invention, the adjusting means includes an elongated screw operatively associated with the base and apparatus in combination with a pair of members disposed at longitudinally opposed ends of the base member. The screw extends throughout the entire length of the depression and passes through openings provided in the members.

The principal object of the present invention is to provide an improved mount which can be rapidly and economically manufactured.

Another object of the present invention is to provide an improved mount which may be manufactured from extruded aluminum or other suitable materials.

Yet another object of the present invention is to provide an improved mount which possesses sufficient torsional rigidity to prevent misalignment of the components.

A further object of the present invention is to provide an improved mount which is lightweight, yet sturdy enough to withstand abuses resulting from continuous use.

A still further object of the present invention is to provide an improved mount which eliminates the need for costly metal forming and connecting processes.

An additional object of the present invention is to provide an improved mount wherein the main portion is a transverse section of an extruded member.

These and other objects and advantages will become apparent from the following description used to illustrate the preferred embodiment of the invention when read in conjunction with the accompanying drawings in which:

FIG. 1 is a perspective view illustrating a motor supported on a mount constructed in accordance with the preferred embodiment of the present invention;

FIG. 2 is an end view of the mount illustrated in FIG. 1;

FIG. 3 is a plan view of the mount;

FIG. 4 is a cross-sectional view taken along line 4—4 of FIG. 3;

FIG. 5 is a cross-sectional view taken along line 5—5 of FIG. 3;

Figure 6:
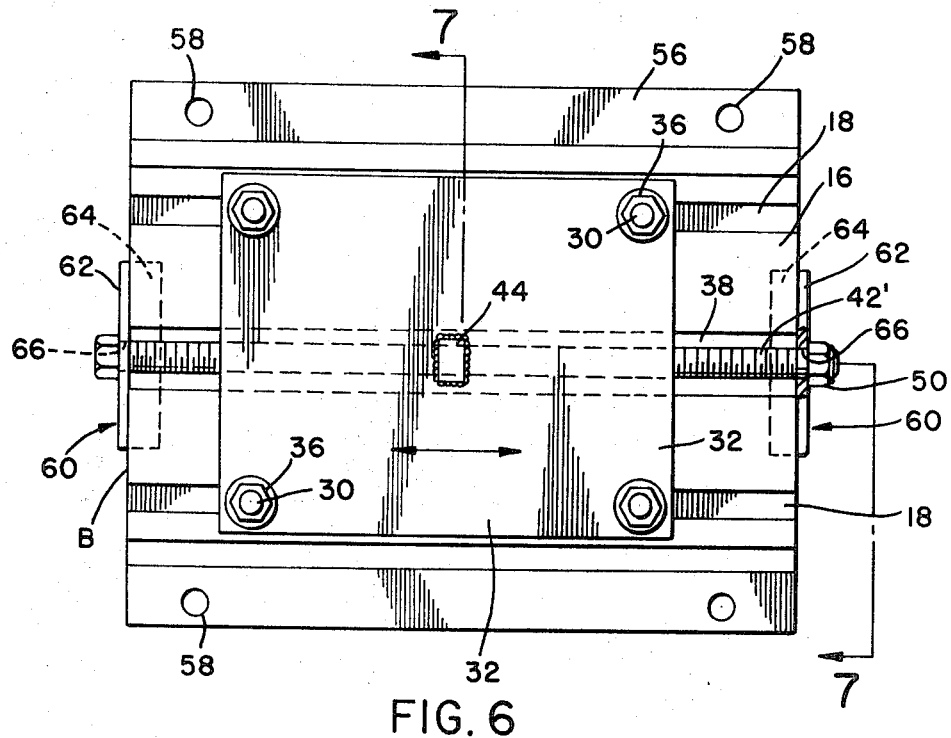
FIG. 6 is an alternative embodiment of the motor mount shown in FIGS. 1–5.

Referring now to the drawings wherein the showings are for the purpose of illustrating a preferred embodiment of the invention only and not for the purpose of limiting same, FIG. 1 shows a mount constructed in accordance with the preferred embodiment of the present invention on which is slidably supported a conventional electric motor A. Although an electric motor has been illustrated, it is to be appreciated that the invention is equally applicable to a variety of apparatus such as gasoline engines or other prime movers. The motor A includes a drive shaft 10 to which has been secured a pulley 12 for rotation therewith. The pulley 12 is drivingly connected by a belt 14 to an input pulley (not illustrated) of a machine.

As best shown in FIGS. 2 and 3, the mount comprises an elongated base member, designated generally by the reference letter B, including an upper supporting surface 16 and a pair of outwardly and downwardly extending legs, each terminating in mounting feet 56. These feet are provided with a plurality of openings 58 which are adapted to receive bolts (not illustrated) for securing the motor mount to a supporting structure (not illustrated).

The base member B also includes a pair of downwardly extending portions defining the wider part of a pair of inverted, substantially T-shaped, parallel slots 18 which depend from the upper surface 16 along opposite sides thereof and extend throughout the entire length of the base member. Although a pair of slots have been shown, it is to be appreciated that a single elongated slot depending from the upper surface 16 of the base member B could be employed with equal success. If a single slot were used, it would preferably be generally coextensive with the longitudinal center line of the base member B. Although the slots 18 have been shown as being of substantially inverted, T-shaped configuration, it is to be appreciated that they may take on a wide variety of shapes, provided a portion of the slot's surface, such as retaining surface portion 20, faces downwardly.

Means are disposed in the slots 18 for releasably securing the motor A on the upper surface 16 which may take a variety of different forms; however, in the preferred embodiment of the invention this takes the form of bolts 22, each having a head portion 24 and a shank portion 30. The head portion 24 is slidably retained in the slot 18 and engages the downwardly facing surface 20 when tightened in position. The shank portion 30 extends upwardly beyond the upper surface 16 of the base member B.

The mount includes a slide 32 carried by the upper surface 16 of the base member B. The slide 32 is located intermediate the motor A and the upper supporting surface 16. The motor A includes mounting brackets 34 which are supported on the slide 32. The shank portion 30 of the bolts 22 extend upwardly through openings in the slide 32 and also through openings in the motor mounting brackets 34. Nuts 36 threadedly engage the shank portions 30, thereby securing the motor A and slide 32 to the base member B. When the nuts 36 are in a loosened state, the motor A and slide 32 may be displaced relative to the base member B. Although the slide 32 has been shown in the preferred embodiment of the invention, it is to be appreciated that this component could be eliminated, in which case the motor A would be carried on the upper surface 16 of the base member B and retained thereon by the bolts 22 and nuts 36.

Adjusting means which may take a number of different forms, such as an elongated screw are operatively associated with the base member B and the motor A, whereby when the screw is rotated the motor is displaced relative to the base member and parallel to the slot. Such an adjusting means could be located in a variety of places on the mount, such as in the slot 18. However, in the preferred embodiment of the invention the cross-sectional shape of the base B has a generally U-shaped portion 38 to define a depression in the upper surface 16 intermediate the slots 18 and extending longitudinally throughout the entire length of the base member B. The adjusting means is disposed within the U-shaped depression and comprises a bracket 40, an elongated screw 42 rotatably mounted on the bracket and extending longitudinally throughout a portion of the depression and a slide nut member 44 secured to the underside of the slide 32 and threadably engaging the screw. The bracket 40 is positioned adjacent one end of the depression 38 and secured to the base member B by welding or other suitable means. As best shown in FIG. 4, the elongated screw 42 passes through an opening in the bracket 40 and is retained in a rotatable position with respect thereto by an adjusting nut 50 and a retaining nut 52 which are both permanently secured to the screw, such as by welding. The elongated screw 42 threadably engages slide nut member 44 which is secured to the underside of the slide 32 (as shown in FIG. 5), whereby when the adjusting nut 50 is rotated the screw also rotates and displaces the slide and motor A relative to the base member B.

The adjusting means further includes stop means for limiting the longitudinal displacement of the slide 32 relative to the base member B. Although the stop means may take a variety of forms, such as a pin or hook, and be positioned at many locations, such as on the slide 32 or the slide nut member 44, in the preferred embodiment it takes the form of a stop nut 54 which has been secured to the end of the elongated screw 42, thereby preventing the screw from becoming threadably disengaged from the slide nut member.

Figure 7:
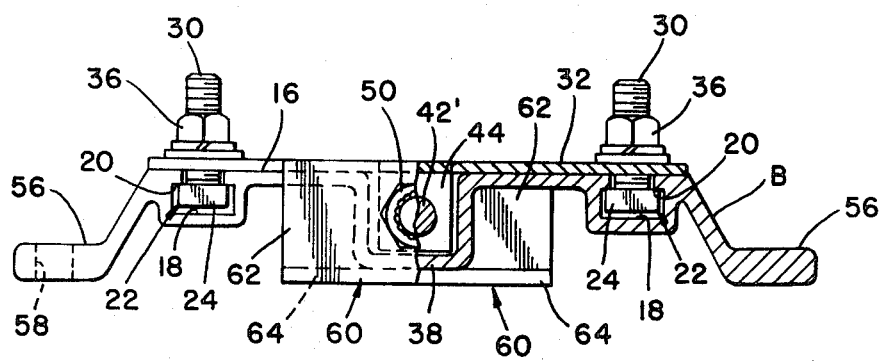
FIG. 7 is a cross-sectional view taken along line 7—7 of FIG. 6.

Reference is now made to FIGS. 6 and 7 wherein a motor mount constructed in accordance with the present invention and having an alternative arrangement of the adjusting means is shown. In this embodiment there is provided a pair of bracket members, designated generally by the reference numeral 60, which are disposed at longitudinally opposed ends of the base member B. The members 60 include a first portion 62 which extends across the end of the depression, and a second portion 64 which extends adjacent to and under the base member B. It is to be appreciated that the members 60, in order to comply with the foregoing structural configuration, may take a variety of forms such as an L-shaped member (as shown in FIGS. 6-7) or a U-shaped member, wherein the base of the U extends across the end of the depression and the legs of the U extend adjacent to the outer surface of the vertical walls defining the depression. A screw 42' threadably engages the nut member 44, and extends throughout the depression to pass through openings 66 in the first portion 62 of each member 60. An adjusting nut 50 is permanently secured to each end of the screw 42' in a suitable manner, such as by welding. The second portion 64 of the member 60 is located directly beneath and adjacent the depression and, taken in combination with the screw 42', serves to maintain the members in their proper position. In this manner the members 60 need not be welded to the base member B. Additionally, the motor A may be adjusted from either end of the mount simply by turning the respective adjusting nut 50.

In the embodiment shown the first portion 62 extends slightly above the upper surface 16 of the base member B and serves as a stop for limiting the travel of the slide 32.

In accordance with the invention the base member B is manufactured by extruding long lengths of aluminum or other suitable metal to the desired cross-sectional shape and then cutting these lengths transversely to the desired shorter length as required. By virtue of using an extrusion, a base member B results which is of unitary or integral construction having a generally uniform transverse cross-sectional shape throughout its entire longitudinal extent. No stamping or other forming steps are required except to provide the openings 58.

Mounts of varying lengths may be rapidly and inexpensively produced by merely cutting the extrusion to the desired longitudinal dimension. Additionally, a mount is produced which possesses a high degree of structural rigidity due to unitary construction thereof. Furthermore, the extrusion process permits the configuration of the mount to be easily changed in order to meet specific design requirements.

In the embodiments shown, the openings 58 change the base member from one of exactly uniform transverse cross-section throughout its entire longitudinal extent to one which is generally uniform. Thus, it will be appreciated that the base member has a transversely uninterrupted cross-sectional contour uniform throughout the entire longitudinal extent thereof, even though openings 58 are provided in mounting feet 56 to facilitate mounting of the base to an underlying support. It will also be appreciated that the base member B on both sides of the U-shaped depression 38, may be generally flat i.e., without the integral T-shaped slot formed therein and instead longitudinal slots cut through in this portion which extend generally i.e., over at least a portion of the entire longitudinal length of the base. In such instances, of course, the downwardly facing surface on each side of the formed slot would be engaged by the head portion 24 of the bolts. The T-shaped slot is preferred, however, because the integral metal bridging or forming the slot gives rigidity to the base.

Although the invention has been described with reference to specific embodiments, variations within the scope of the following claims will be apparent to those skilled in the art.

Having thus described my invention, I claim:

1. A mount for adjustably supporting an apparatus comprising: an elongated, integral, one piece base member having a transversely uninterrupted cross-sectional contour uniform throughout the entire longitudinal extent thereof and providing in cross section an upper supporting surface, integral mounting feet depending from opposite sides thereof and an upwardly open closed bottom depression intermediate said opposite sides, said supporting surface mounting feet and depression being longitudinally coextensive, slide means overlying said depression and support surface and interconnectable with the apparatus at locations on said slide means laterally outwardly of said depression to support the apparatus relative to the base member, and adjusting means in said depression interconnected with said slide means for displacing said slide means relative to said base member.

2. The mount defined in claim 1, wherein said supporting surface includes at least one closed bottom longitudinal recess positioned laterally outwardly of said depression and longitudinally coextensive with said base member for longitudinally receiving and guiding securing means for interconnecting the apparatus and slide means.

3. The mount defined in claim 2, wherein said adjusting means includes an elongated screw extending throughout at least a portion of said depression and operatively associated with said base member ans slide means.

4. A mount for adjustably supporting an apparatus comprised of an elongated, integral, one piece base member having a transversely uninterrupted cross-sectional contour uniform throughout the longitudinal extent thereof and providing in cross section an upper supporting surface for the apparatus, integral mounting feet depending from opposite sides thereof, an upwardly open longitudinal depression in said supporting surface and at least one upwardly open closed bottom longitudinal recess in said supporting surface for longitudinally receiving and guiding securing means for said apparatus, said supporting surface, mounting feet, depression and recess being longitudinally coextensive, said recess having an outer portion adjacent said supporting surface and a laterally larger inner portion below said supporting surface providing a retaining surface adapted to be engaged by said securing means when said apparatus is secured thereby, and adjusting means disposed in said depression for displacing the apparatus relative to said base member.

5. A mount for adjustably supporting an apparatus comprising: an elongated, integral, one-piece base member having a transversely uninterrupted cross-sectional contour uniform throughout the longitudinal extent thereof and providing in cross section an upper supporting surface for the apparatus, integral mounting feet depending from opposite sides thereof, a pair of inverted T-shaped parallel recesses in said supporting surface along opposite sides of said base member for longitudinally receiving and guiding releasable securing means for said apparatus and an upwardly open generally U-shaped depression in said supporting surface intermediate said recesses, said supporting surface, mounting feet, depression and recesses being longitudinally coextensive, said recesses each having an outer portion adjacent said supporting surface and a laterally larger inner portion below said supporting surface providing a retaining surface adapted to be engaged by said releasable securing means when said apparatus is secured thereby, a slide carried by said supporting surface, said slide having openings corresponding in location to said recesses when said slide is positioned on said supporting surface above said recesses, said releasable securing means comprising a plurality of bolts having head portions and shank portions, said head portions being retained in said recesses by said retaining surfaces and said shank portions extending upwardly through said openings and adapted to engage the apparatus, a pair of bracket members positioned on opposite longitudinal ends of said base member at the terminal points of said depression, an elongated rotatable screw extending longitudinally from one of said bracket members to the other of said bracket members and throughout the length of said depression, and a nut member secured to the underside of said slide and threadably engaging said screw, whereby when said screw is rotated said slide and the apparatus thereon are displaced relative to said base member.

6. The mount defined in claim 5, wherein said bracket members have a first portion extending across a respective end of said depression and a second portion extending under and adjacent to said base member, said first portion including an opening therein, said screw being carried in said opening, and means secured on at least one end of said screw for facilitating the rotation of said screw, whereby the arrangement of said bracket members and screw prevents displacement of said bracket members relative to said base member.

7. The mount defined in claim 2, wherein a pair of said recesses are provided and said depression is generally U-shaped and intermediate said pair of recesses, and wherein said adjusting means includes a bracket member mounted at one end of said depression, an elongated screw rotatably mounted on said bracket member and extending longitudinally throughout a portion of said depression, and a nut member secured to the underside of said slide means and threadably engaging said screw, whereby when said screw is rotated said slide means and the apparatus thereon are displaced relative to said base member.

8. The mount defined in claim 7, wherein said adjusting means further includes stop means for limiting the longitudinal displacement of said slide means relative to said base member.

\* \* \* \* \*